US012784106B2

(12) United States Patent
Pathak et al.

(10) Patent No.: US 12,784,106 B2
(45) Date of Patent: Nov. 3, 2026

(54) SENTIMENT BASED ENHANCEMENT OF INVESTOR RELATIONS COMMUNICATION

(71) Applicant: Dell Products L.P., Round Rock, TX (US)

(72) Inventors: Priyanka Pathak, Telangana (IN); Sailendu Kumar Patra, Bangalore (IN); Saurabh Jha, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 35 days.

(21) Appl. No.: 18/544,016

(22) Filed: Dec. 18, 2023

(65) Prior Publication Data

US 2025/0200663 A1 Jun. 19, 2025

(51) Int. Cl.
*G06Q 40/06* (2012.01)
*G06F 40/30* (2020.01)

(52) U.S. Cl.
CPC ............. *G06Q 40/06* (2013.01); *G06F 40/30* (2020.01)

(58) Field of Classification Search
CPC ................................ G06Q 40/06; G06F 40/30
See application file for complete search history.

(56) References Cited

U.S. PATENT DOCUMENTS

2021/0043211 A1* 2/2021 Leidner .................... G06F 16/35
2022/0358594 A1* 11/2022 Zhu ........................ G06N 20/00
2024/0185270 A1* 6/2024 Zhu ........................ G06F 40/126

OTHER PUBLICATIONS

Advanced Deep Learning Techniques for Analyzing Earnings Call Transcripts (Year: 2025).*
An intuitive introduction to text embeddings (Year: 2023).*
Extract Trading Signal from Earnings Conference (Year: 2024).*
Chen, Jason V. et al., "Manager-Analyst Conversations in Earnings Conference Calls" (Jun. 8, 2018). Review of Accounting Studies, 2018, 23(4), 1315-1354.
Kothari, S.P. and Shu, Susan and Wysocki, Peter D., "Do Managers Withhold Bad News?", Journal of Accounting Research, Forthcoming, MIT Sloan Research Paper No. 4556-05, Sep. 2008.
Lee, Joshua. (2016). "Can Investors Detect Managers' Lack of Spontaneity? Adherence to Pre-determined Scripts during Earnings Conference Calls", American Accounting Association, The Accounting Review 91 (1): 229-250.

(Continued)

*Primary Examiner* — Arunava Chakravarti
(74) *Attorney, Agent, or Firm* — Chamberlain, Hrdlicka, White, Williams & Aughtry; Aly Z. Dossa

(57) ABSTRACT

A method for sentiment based enhancement of investor relations communication. The method includes: receiving an enhancement request including an original current earnings call transcript; processing, of the original current earnings call transcript, a plurality of original sentiment-pertinent transcript sentences using language models to respectively obtain a plurality of transcript sentence ranks; identifying a subset of the plurality of transcript sentence ranks each indicating a sentiment improvement; producing, from the original current earnings call transcript, a new current earnings call transcript including a set of enhanced sentiment-pertinent transcript sentences respectively mapped to the subset of the plurality of transcript sentence ranks; and providing the new current earnings call transcript in response to the enhancement request.

3 Claims, 8 Drawing Sheets

(56) References Cited

OTHER PUBLICATIONS

Matsumoto, Dawn et al. E.P. (2011). "What Makes Conference Calls Useful? The Information Content of Managers' Presentations and Analysts' Discussion Sessions", The Accounting Review, vol. 86, No. 4, 2011, 1383-1414.
Palmon, Dan and Xu, Ke and Yezegel, Ari, "What Does 'But' Really Mean?—Evidence from Managers' Answers to Analysts' Questions During Conference Calls" (Aug. 29, 2016).

* cited by examiner

System 100

Example Sentiment-Pertinent Transcript Sentences 400

Example Original Sentiment-Pertinent Transcript Sentence 402

*"We will keep navigating the difficult supply environment with our distinct business model, which includes our flexible product design, our privileged supply chain, and our distinct direct go-to-market strategy that generates a high-quality demand signal and enables us to mold demand to fit our supply."*

Example Enhanced Sentiment-Pertinent Transcript Sentence 404

*"We will continue to navigate the challenging supply environment with our differentiated business model – our advantaged supply chain, our product design flexibility, and our unique direct go-to-market which creates a high quality demand signal and gives us the ability to shape demand to where we have supply."*

FIG. 4

SENTIMENT BASED ENHANCEMENT OF INVESTOR RELATIONS COMMUNICATION

BACKGROUND

Earnings conference calls are typically held by publicly traded organizations to discuss their financial results with investors, analysts, and the media. During these earnings conference calls, organization executives provide an overview of the organization's financial performance, highlight key accomplishments, and discuss any factors that may have affected any said financial results. Earnings conference calls thus provide a forum for organizations to communicate directly with their investors and other stakeholders about their financial performance and outlook.

SUMMARY

In general, in one aspect, embodiments described herein relate to a method for sentiment based enhancement of investor relations communication. The method includes: receiving an enhancement request including an original current earnings call transcript; processing, of the original current earnings call transcript, a plurality of original sentiment-pertinent transcript sentences using language models to respectively obtain a plurality of transcript sentence ranks; identifying a subset of the plurality of transcript sentence ranks each indicating a sentiment improvement; producing, from the original current earnings call transcript, a new current earnings call transcript including a set of enhanced sentiment-pertinent transcript sentences respectively mapped to the subset of the plurality of transcript sentence ranks; and providing the new current earnings call transcript in response to the enhancement request.

In general, in one aspect, embodiments described herein relate to a non-transitory computer readable medium (CRM). The non-transitory CRM includes computer readable program code, which when executed by a computer processor, enables the computer processor to perform a method for sentiment based enhancement of investor relations communication. The method includes: receiving an enhancement request including an original current earnings call transcript; processing, of the original current earnings call transcript, a plurality of original sentiment-pertinent transcript sentences using language models to respectively obtain a plurality of transcript sentence ranks; identifying a subset of the plurality of transcript sentence ranks each indicating a sentiment improvement; producing, from the original current earnings call transcript, a new current earnings call transcript including a set of enhanced sentiment-pertinent transcript sentences respectively mapped to the subset of the plurality of transcript sentence ranks; and providing the new current earnings call transcript in response to the enhancement request.

In general, in one aspect, embodiments described herein relate to an investor relations communication enhancer. The investor relations communication enhancer includes: a computer processor configured to perform a method for sentiment based enhancement of investor relations communication. The method includes: receiving an enhancement request including an original current earnings call transcript; processing, of the original current earnings call transcript, a plurality of original sentiment-pertinent transcript sentences using language models to respectively obtain a plurality of transcript sentence ranks; identifying a subset of the plurality of transcript sentence ranks each indicating a sentiment improvement; producing, from the original current earnings call transcript, a new current earnings call transcript including a set of enhanced sentiment-pertinent transcript sentences respectively mapped to the subset of the plurality of transcript sentence ranks; and providing the new current earnings call transcript in response to the enhancement request.

Other aspects of the embodiments described herein will be apparent from the following description and the appended claims.

BRIEF DESCRIPTION OF DRAWINGS

Certain embodiments described herein will be described with reference to the accompanying drawings. However, the accompanying drawings illustrate only certain aspects or implementations of the embodiments by way of example and are not meant to limit the scope of the claims.

FIG. 4 shows example sentiment-pertinent transcript sentences in accordance with one or more embodiments described herein.

DETAILED DESCRIPTION

Figure 1A:
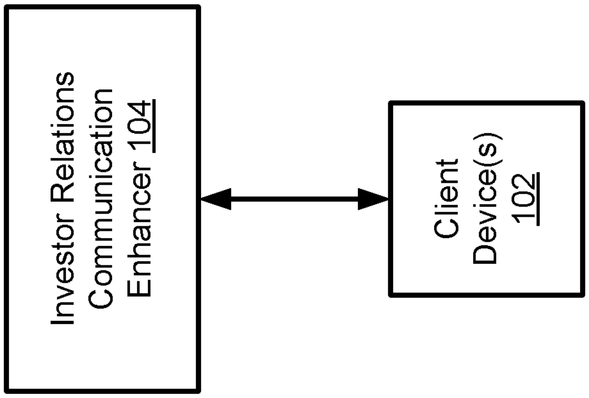
FIG. 1A shows a system in accordance with one or more embodiments described herein.

Specific embodiments will now be described with reference to the accompanying figures.

In the below description, numerous details are set forth as examples of embodiments described herein. It will be understood by those skilled in the art (who also have the benefit of this Detailed Description) that one or more embodiments of embodiments described herein may be practiced without these specific details, and that numerous variations or modifications may be possible without departing from the scope of the embodiments described herein. Certain details known to those of ordinary skill in the art may be omitted to avoid obscuring the description.

In the below description of the figures, any component described with regard to a figure, in various embodiments described herein, may be equivalent to one or more like-named components described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements, nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

In general, embodiments described herein relate to sentiment based enhancement of investor relations communication. For context, earnings conference calls are typically held by publicly traded organizations to discuss their financial results with investors, analysts, and the media. During these earnings conference calls, organization executives provide an overview of the organization's financial performance, highlight key accomplishments, and discuss any factors that may have affected any said financial results. Earnings conference calls thus provide a forum for organizations to communicate directly with their investors and other stakeholders about their financial performance and outlook. As such, earnings conference calls can help to improve transparency and build trust with investors, which can in turn support the organization's stock price and overall financial health.

Furthermore, earnings conference calls are often conducted following the release of earnings results for an organization, which traditionally occurs on a quarterly basis, however said occurrence may ultimately depend on the organization's financial reporting schedule. Earnings conference calls include, but are not limited to, an opening statement from an organization representative, followed by a presentation of the organization's financial results and, thereafter, a question-and-answer session with analysts and investors. Further, earnings conference calls are open to the public and are available via various communication mediums.

A pain point for an organization in understanding how their conveyance of any investor relations communication (e.g., earnings conference calls) will be interpreted by analysts and investors is the potential for misunderstandings or misinterpretations. Even if the organization presents information clearly and accurately, there is always a risk that said information can be misunderstood or taken out of context by analysts and investors. Additionally, the language and terminology used during earnings conference calls can be technical and difficult for those without a financial background to comprehend. Hence, it may be challenging for the organization to ensure that their message is being understood properly by all stakeholders. Finally, the overall sentiment and market reaction to an organization's earnings can be difficult to predict, whereas the organization may not always be able to anticipate how their investor relations communication will be received by analysts and investors.

Sentiment analysis can help overcome the above-mentioned issue(s) through assessment of the sentiment expressed within certain sections of earnings conference call transcripts. Said assessment can provide valuable insights into the overall sentiment reflective of the organization and the financial performance thereof, thereby allowing the organization to identify any potential areas of concern. Moreover, by understanding the sentiment around their earnings, an organization can take steps to address any negative sentiment that may be involuntarily conveyed during, where any said taken steps can clarify their financial position proceeding, any earnings conference call.

Embodiments described herein employ deep reinforcement learning and supervised natural language processing (NLP) to enhance investor relations communication. The task of sentiment analysis in the finance domain can be formulated as a sequential decision process—i.e., the sentiment of a financial document (or at least a portion thereof) can sway the movement of an organization's share price. This can be naturally addressed by using a policy gradient method, which refers to a reinforcement learning algorithm directed to making decisions based on a current state of a system and any long-term rewards or outcomes associated with each action.

Embodiments described herein, moreover, propose a solution capable of generating informed content for earnings conference calls using a combination of auto-regressive language models, deep reinforcement learning, and human feedback. The solution uses a supervised-learning language model and a reinforced-learning language model. The former generates sentiment scores at a sentence level, as well as at a document level, and assigns sentiment polarity (e.g., neutral, positive, or negative) to the sentence or document text. The former further uses seeded text to predict the next word in any text sequence, thereby generating new sentences based on sentiments expressed in the text. The latter, meanwhile, incorporates a policy neural network and treats the problem as a partially observable Markov decision process (POMDP) where the observations are inclusive of various features like macro-economic factors, current earnings, stock price, and other key performance indicators (KPIs) related to market and/or stock performance. Using this approach, the latter generates content that conveys precise information in a manner that can prompt favorable market reactions, while mitigating unfavorable market reactions, from investors, analysts, and other stakeholders.

FIG. 1A shows a system in accordance with one or more embodiments described herein. The system (100) may include one or more client devices (102) and an investor relations communication enhancer (104). Each of these system (100) components is described below.

In one or many embodiment(s) described herein, any client device (102) may represent a physical appliance or computing device operated by one or more individuals of (or employed by) an organization. Examples of said individual(s) may include, but is/are not limited to, any organization executive(s) (e.g., chief executive officer (CEO), chief financial officer (CFO), vice president (VP) of investor relations (IR), etc.), and any employee(s) in the IR department of the organization (e.g., an IR expert). Further, the organization may refer to any enterprise at least engaged in for-profit commercial, industrial, or professional activities.

Examples of any client device (102) may include, but are not limited to, a desktop computer, a laptop computer, a network server, a smartphone, a tablet computer, or any other computing device similar to the computing system illustrated and described with respect to FIG. 3, below.

In one or many embodiment(s) described herein, and at least in part, any client device (102) may include functionality to: generate and transmit any number of enhancement requests to the investor relations communication enhancer (104), where said enhancement request(s) may each include or specify an original current earnings call transcript; and receive, in response to transmitting any given enhancement request, a new (or enhanced) current earnings call transcript. Further, one of ordinary skill will appreciate that any client device (102) may perform other functionalities without departing from the scope of the embodiments described herein.

In one or many embodiment(s) described herein, the investor relations communication enhancer (104) may represent any enterprise information technology (IT) infrastructure at least configured to improve the underlying sentiment at a sentence level, as well as at a document level, expressed within an earnings call transcript drafted for any pending (or yet to be conducted) earnings conference call(s) by representatives of an organization. By improving the sentimentality of the earnings call transcript, and thus of a pending earnings conference call by association, any disclosed content may be conveyed in a better manner that can prompt favorable market reactions, while mitigating unfavorable market reactions, applicable to the organization's stock by investors, analysts, and other stakeholders.

In one or many embodiment(s) described herein, the investor relations communication enhancer (104) may be implemented through on-premises infrastructure, cloud computing infrastructure, or any hybrid infrastructure thereof. As such, the investor relations communication enhancer (104) may be implemented using one or more network servers (not shown), where each network server may represent a physical network server or a virtual network server. Additionally, or alternatively, the investor relations communication enhancer (104) may be implemented using one or more computing systems similar to the computing system illustrated and described with respect to FIG. 3, below.

In one or many embodiment(s) described herein, and at least in part, the investor relations communication enhancer (104) may include functionality to: perform sentiment based investor relations communication enhancement—the method for doing so being illustrated and described below with respect to FIGS. 2A-2D. One of ordinary skill, however, will appreciate that the investor relations communication enhancer (104) may perform other functionalities without departing from the scope of the embodiments described herein. Moreover, the investor relations communication enhancer (104) is illustrated and described in further detail below with respect to FIG. 1B.

In one or many embodiment(s) described herein, the above-mentioned system (100) components may communicate with one another through a network (not shown) (e.g., a local area network (LAN), a wide area network (WAN) such as the Internet, a mobile network, any other network type, or any combination thereof). The network may be implemented using any combination of wired and/or wireless connections. Further, the network may encompass various interconnected, network-enabled subcomponents (or systems) (e.g., switches, routers, gateways, etc.) that may facilitate communications between the above-mentioned system (100) components. Moreover, in communicating with one another, the above-mentioned system (100) components may employ any combination of wired and/or wireless communication protocols.

While FIG. 1A shows a configuration of components and/or subcomponents, other system (100) configurations may be used without departing from the scope of the embodiments described herein.

Figure 1B:
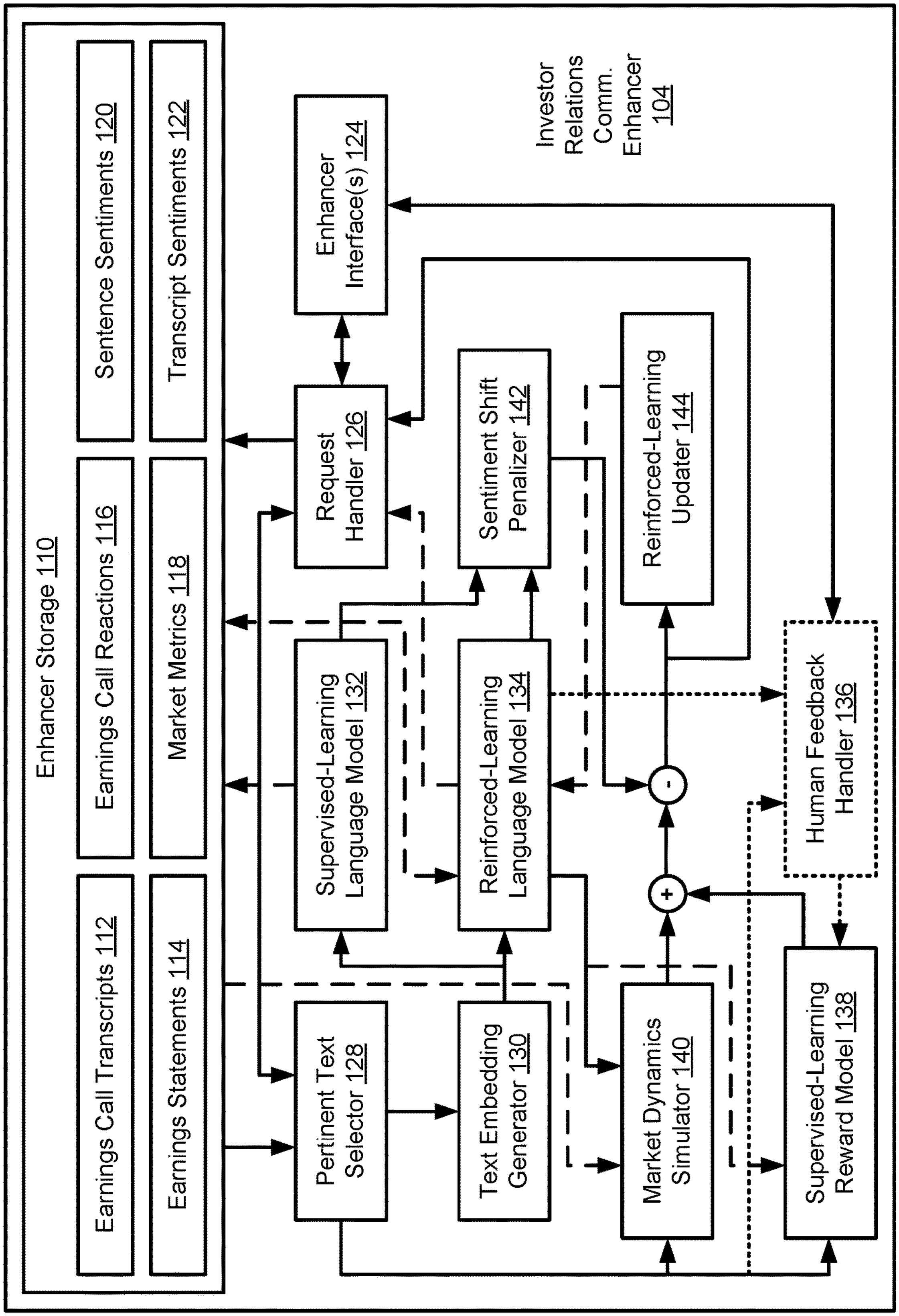
FIG. 1B shows an investor relations communication enhancer in accordance with one or more embodiments described herein.

FIG. 1B shows an investor relations communication enhancer in accordance with one or more embodiments described herein. The investor relations communication enhancer (104) may include enhancer storage (110), one or more enhancer interfaces (124), a request handler (126), a pertinent text selector (128), a text embedding generator (130), a supervised-learning language model (132), a reinforced-learning language model (134), a human feedback handler (136), a supervised-learning reward model (138), a market dynamics simulator (140), a sentiment shift penalizer (142), and a reinforced-learning updater (144). Each of these investor relations communication enhancer (104) components is described below.

In one or many embodiment(s) described herein, the enhancer storage (110) may refer to a collection of one or more physical storage devices (not shown) on or across which various forms of digital information—e.g., earnings call transcripts (112), earnings statements (114), earnings call reactions (116) market metrics (118), sentence sentiments (120), and transcript sentiments (122) (each described below)—may be maintained. Each physical storage device may encompass non-transitory computer readable storage media on which said digital information may be stored in whole or in part, and temporarily or permanently. Further, the enhancer storage (110) may, at least in part, be implement using persistent (i.e., non-volatile) storage. Examples of persistent storage may include, but may not be limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM). Moreover, digital information maintained in/on the enhancer storage (110) is not limited to the aforementioned specific examples.

In one or many embodiment(s) described herein, any earnings call transcript (112) may refer to a text document in which a financial performance, a financial strategy, and a future outlook of an organization for a given time period (e.g., a quarter of a year) may be disclosed. The disclosed information may be structured or organized into any number of headings or sections. In turn, each heading/section may include or recite any number of sentences or lines of text that provides information describing or detailing the heading/section. Examples of headings/sections breaking down any earnings call transcript (112) may include, but are not limited to: an introduction, a safe harbor statement, an overview, detailed financial results, questions & answers, and a conclusion. Further, the earnings call transcripts (112) may include a current earnings call transcript (for a current time period) and any number of historical earnings call transcripts (for any number of past time periods).

In one or many embodiment(s) described herein, any earnings statement (114) may refer to a text document in which valuable insights into the operations of an organization, an efficiency of the management of the organization, any underperforming sector(s) of the organization, and a performance of the organization relative to industry peers for a given time period may be disclosed. Said insights may be derived from data presented throughout any earnings statement (114) respective to the revenue, expenses, and profitability (e.g., gains and losses) reported by the organization for a given time period. Further, the earnings statements (114) may include a current earnings statement (for a current time period) and any number of historical earnings statements (for any number of past time periods).

In one or many embodiment(s) described herein, any earnings call reaction (116) may refer to an analyst rating applicative to an economic stock associated with an organization for a given time period. Any earnings call reaction (116), further, may at least be influenced based on information disclosed in an earnings statement (114) for the same time period, information disclosed during an earnings conference call for the same time period, and other factors (e.g., surveys, research, etc.) that may reveal a financial state of the organization for the same time period. Examples of an earnings call reaction (116) may include, but are not limited to: the term “buy” indicating an expectation that the organization’s stock will outperform relative to the economic market and thus any investor(s) is/are recommended to buy said organization’s stock; the term “sell” indicating an expectation that the organization’s stock will underperform relative to the economic market and thus any investor(s) is/are recommended to sell said organization’s stock; and the term “hold” indicating an expectation that the organization’s stock will be an economic market performer and thus any investor(s) is/are recommended to hold said organization’s stock. Further, the earnings call reactions (116) may include a predicted earnings call reaction (for a current time period) and any number of historical earnings call reactions (for any number of past time periods).

In one or many embodiment(s) described herein, any market metric (118) may refer to a performance indicator, which may quantify an aspect of the macro-economy for a given time period. Analysts, investors, and other stakeholders may come to understand current and future economic activity and opportunity using any number of market metrics (118). Examples of a market metric (118) may include, but are not limited to, a gross domestic product (GDP), an unemployment rate, consumer spending, an inflation measure (e.g., consumer price index (CPI)), GDP growth, and a prime interest rate. Further, the market metrics (118) may include a set of current market metrics (for a current time period) and any number of sets of historical market metrics (for any number of past time periods).

In one or many embodiment(s) described herein, any sentence sentiment (120) may refer to an underlying emotion or opinion behind a given sentence (or line of text). Any sentence sentiment (120), moreover, may be defined through a pair of parameters—i.e., a sentiment tone, and a sentiment score or confidence. The sentiment tone may refer to a predicted polarity (or class) of the mood or mentality (e.g., positive, negative, or neutral) expressed in the given sentence, whereas the sentiment score/confidence may refer to a numerical value reflecting a likelihood or probability that the sentiment tone is correct. Further, the sentence sentiments (120) may include any number of sentence sentiments for any number of sentences (or lines of text), respectively, selected from each earnings call transcript included amongst the earnings call transcripts (112).

In one or many embodiment(s) described herein, any transcript sentiment (122) may refer to an underlying emotion or opinion behind a given earnings call transcript (or a collection of lines of text). Any transcript sentiment (122), moreover, may be defined through a pair of parameters—i.e., a sentiment tone, and a sentiment score or confidence. The sentiment tone may refer to a predicted polarity (or class) of the mood or mentality (e.g., positive, negative, or neutral) expressed in the given earnings call transcript, whereas the sentiment score/confidence may refer to a numerical value reflecting a likelihood or probability that the sentiment tone is correct. Further, the transcript sentiments (122) may include a transcript sentiment for each earnings call transcript included amongst the earnings call transcripts (112).

In one or many embodiment(s) described herein, any enhancer interface (124) may refer to networking hardware (e.g., a network card or adapter), a computer program implementing a logical interface (e.g., an application programming interface (API)) and executing on the underlying hardware of the investor relations communication enhancer (104), an interactivity protocol, or any combination thereof, at least configured to enable or facilitate communications (or information exchange) between the investor relations communication enhancer (104) and other entities (e.g., any client device(s) (see e.g., FIG. 1A)).

In one or many embodiment(s) described herein, the request handler (126) may refer to instruction-processing hardware (e.g., any number of integrated circuits for processing computer readable instructions), a computer program executing on the underlying hardware of the investor relations communication enhancer (104), or any combination thereof. Further, the request handler (126) may at least be configured to process any enhancement request(s) submitted by any client device(s) to the investor relations communication enhancer (104). In processing said enhancement request(s), the request handler (126) may, at least in part, orchestrate the sentimental improvement of certain portions of any original (i.e., pre-enhanced) earnings call transcript to produce a corresponding new (i.e., post-enhanced) earnings call transcript, which may then be returned to the client device(s) responsible for submitting the enhancement request(s).

In one or many embodiment(s) described herein, the pertinent text selector (128) may refer to instruction-processing hardware (e.g., any number of integrated circuits for processing computer readable instructions), a computer program executing on the underlying hardware of the investor relations communication enhancer (104), or any combination thereof. Further, the pertinent text selector (130) may at least be configured to identify and/or extract select text (e.g., a collection of sentences representing a subset of the total number of sentences recited throughout a document) predetermined to perform sentiment analysis. Particularly, of any original (i.e., pre-enhanced) earnings call transcript, certain headings/sections (e.g., detailed financial results and questions & answers) may provide valuable insights into an overall sentiment of the organization, their performance, and prospective market reactions influenced by the content discussed (and reflected via one or more sentences or lines of text) in said certain headings/sections. Said certain headings/sections may be pertinent to the sentiment analysis process, and therefore, any earnings conference call to be conducted that may be based on said original earnings call transcript.

In one or many embodiment(s) described herein, the text embedding generator (130) may refer to instruction-processing hardware (e.g., any number of integrated circuits for processing computer readable instructions), a computer program executing on the underlying hardware of the investor relations communication enhancer (104), or any combination thereof. Further, the text embedding generator (130) may at least be configured to perform text vectorization entailing the translation of certain text (e.g., a sentence) to a numerical representation (or text embedding) thereof. Any text embedding may be expressed as a vector or array reflecting an ordered sequence of numbers, where the vector/array may be of any arbitrary size (i.e., have any number of vector/array elements). Further, each numerical value forming said text embedding may reference a dimension (i.e., often depicted as a word) within a vocabulary (i.e., any number of unique words) chosen from a corpus (i.e., collection of texts in the finance domain). The numerical values themselves may each, for example, indicate: whether the corresponding dimension/word appears in a given sentence (where the vector/array is described as sparse); or a frequency of said dimension/word that appears in the given sentence (where the vector/array is described as dense).

In one or many embodiment(s) described herein, the supervised-learning language model (132) may refer to instruction-processing hardware (e.g., any number of integrated circuits for processing computer readable instructions), a computer program executing on the underlying hardware of the investor relations communication enhancer (104), or any combination thereof. Further, the supervised-learning language model (132) may at least be configured to employ one or more supervised (i.e., learning engaged through training using labeled datasets) machine learning or artificial intelligence paradigms in order to predict or produce: a sentence sentiment (120) for any selected sentence (s) of an original (i.e., pre-enhanced) earnings call transcript; and a transcript sentiment (122) for said original earnings call transcript in entirety. Inputs, processed by the supervised-learning language model (132) to arrive at the aforementioned sentence sentiment(s) and transcript sentiment, may include a text embedding (described above) for each sentence selected from said original earnings call transcript.

In one or many embodiment(s) described herein, the reinforced-learning language model (134) may refer to instruction-processing hardware (e.g., any number of integrated circuits for processing computer readable instructions), a computer program executing on the underlying hardware of the investor relations communication enhancer (104), or any combination thereof. Further, the reinforced-learning language model (134) may at least be configured to employ one or more reinforced (i.e., learning engaged through environment interactions) machine learning or artificial intelligence paradigms in order to predict or produce: a set of new (i.e., not necessarily post-enhanced) sentences corresponding, respectively, to any selected sentence(s) of an original (i.e., pre-enhanced) earnings call transcript; a sentence sentiment (120) for each said new sentence; and a transcript sentiment (122) for a new earnings call transcript, in entirety, derived from the incorporation of said set of new sentences into said original earnings call transcript. Inputs, processed by the reinforced-learning language model (134) to arrive at the aforementioned set of new sentences, sentence sentiment(s), and transcript sentiment, may include a text embedding (described above) for each sentence selected from said original earnings call transcript and a collection of other input features (exemplified below in Step 208 of FIG. 2A).

In one or many embodiment(s) described herein, the human feedback handler (136) may refer to instruction-processing hardware (e.g., any number of integrated circuits for processing computer readable instructions), a computer program executing on the underlying hardware of the investor relations communication enhancer (104), or any combination thereof. Further, the human feedback handler (136) may at least be configured to interact with a human investor relations expert to obtain feedback therefrom in the form of a sentence rank for each new sentence predicted/produced by the reinforced-learning language model (134). Any sentence rank may indicate an opinion of the human investor relations expert concerning a sentimentality comparison performed thereby between an original sentence and a corresponding new sentence.

In one or many embodiment(s) described herein, the supervised-learning reward model (138) may refer to instruction-processing hardware (e.g., any number of integrated circuits for processing computer readable instructions), a computer program executing on the underlying hardware of the investor relations communication enhancer (104), or any combination thereof. Further, the supervised learning reward model (138) may at least be configured to employ one or more supervised (i.e., learning engaged through training using labeled datasets) machine learning or artificial intelligence paradigms in order to predict or produce: a sentence rank (described above) for each new sentence predicted/produced by the reinforced-learning language model (134). Inputs, processed by the supervised-learning reward model (138) to arrive at the sentence rank (s), may include a text embedding (described above) for each sentence selected from an original (i.e., pre-enhanced) earnings call transcript and another text embedding for each said new sentence corresponding to a given selected sentence.

In one or many embodiment(s) described herein, the market dynamics simulator (140) may refer to instruction-processing hardware (e.g., any number of integrated circuits for processing computer readable instructions), a computer program executing on the underlying hardware of the investor relations communication enhancer (104), or any combination thereof. Further, the market dynamics simulator (140) may at least be configured to model an environment in which the financial performance of an organization's stock may be simulated based, at least in part, on the set of new sentences predicted/produced by the reinforced-learning language model (134). Particularly, the market dynamics simulator (140) may employ ensemble Gaussian processes and historical data (e.g., past earnings call transcript(s), past earnings statement(s), and/or past earnings call reaction(s)) to predict a prospective earnings call reaction (116) directed to a prospective earnings conference call scripted by a new (i.e., post-enhanced) earnings call transcript.

In one or many embodiment(s) described herein, the sentiment shift penalizer (142) may refer to instruction-processing hardware (e.g., any number of integrated circuits for processing computer readable instructions), a computer program executing on the underlying hardware of the investor relations communication enhancer (104), or any combination thereof. Further, the sentiment shift penalizer (142) may at least be configured to compute sentiment shift penalties needed, at least in part, to fine tune the reinforced-learning language model (134). Any sentiment shift penalty may refer to a scalar, numerical value representing a difference in sentiments predicted/produced by the supervised-learning language model (132) and the reinforced-learning language model (134).

In one or many embodiment(s) described herein, the reinforced-learning updater (144) may refer to instruction-processing hardware (e.g., any number of integrated circuits for processing computer readable instructions), a computer program executing on the underlying hardware of the investor relations communication enhancer (104), or any combination thereof. Further, the reinforced-learning updater (144) may at least be configured to employ one or more model optimization algorithms directed to updating any number of model parameters and/or model hyper-parameters defining the reinforced-learning language model (134). Said updating may, at least in part, rely on a final reward score derived using outputs from the supervised-learning reward model (138), the market dynamics simulator (140), and the sentiment shift penalizer (142).

While FIG. 1B shows a configuration of components and/or subcomponents, other investor relations communication enhancer (104) configurations may be used without departing from the scope of the embodiments described herein.

FIGS. 2A-2D show a flowchart describing a method for sentiment based enhancement of investor relations communication in accordance with one or more embodiments described herein. The various steps outlined below may be performed by the investor relations communication enhancer (see e.g., FIGS. 1A and 1B). Further, while the various steps in the flowchart are presented and described sequentially, one of ordinary skill will appreciate that some or all steps may be executed in different orders, may be combined or omitted, and some or all steps may be executed in parallel.

Figure 2A:
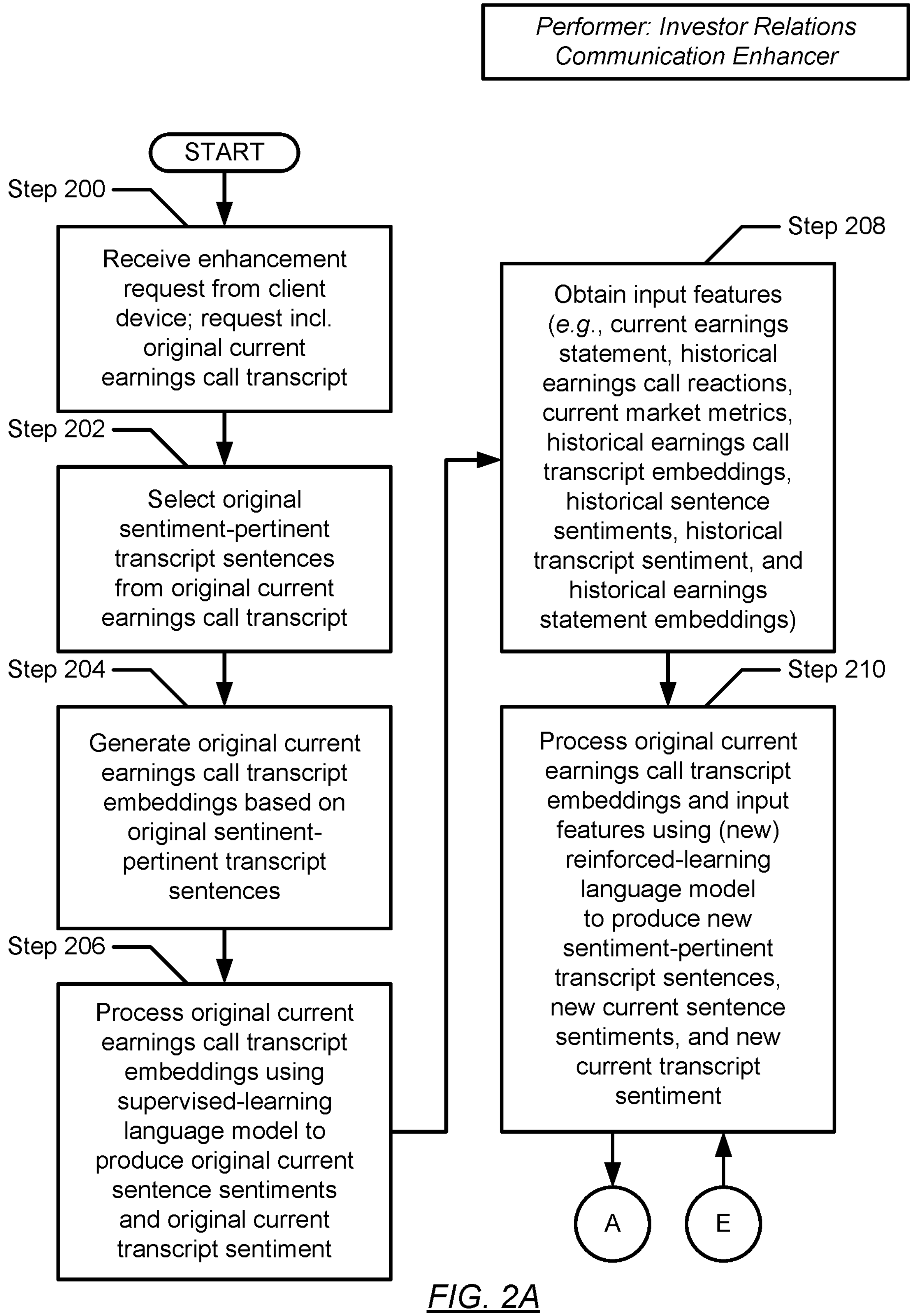
FIGS. 2A-2D show a flowchart describing a method for sentiment based enhancement of investor relations communication in accordance with one or more embodiments described herein.

Turning to FIG. 2A, in Step 200, an enhancement request is received from a client device (see e.g., FIG. 1A). In one or many embodiment(s) described herein, the enhancement request may include or specify an original current earnings call transcript, and thus may pertain to improving or enhancing said original current earnings call transcript. Particularly, through said improvement/enhancement outlined in the method hereinafter, a resulting improved/enhanced version of said original current earnings call transcript may positively impact (or increase) an understanding of a broad market sentiment towards any future earnings conference call directed by the new (or enhanced) current earnings call transcript. Said new/enhanced current earnings call transcript, further, may clarify investor relations communication concerning a current financial state and any prospective goal(s) of an organization, thereby avoiding any misunderstandings or misinterpretations by investors and analysts alike participating in (or reviewing) the future earnings conference call once held.

In Step 202, one or more original sentiment-pertinent transcript sentences is/are selected (or identified) from the original current earnings call transcript (received via the enhancement request in Step 200). In one or many embodiment(s) described herein, the original current earnings call transcript may refer to a text document in which a financial performance, a financial strategy, and a future outlook of an organization for a current time period (e.g., a quarter of a year) may be disclosed. The disclosed information may be structured or organized into any number of headings or sections. In turn, each heading/section may include or recite any number of sentences or lines of text that provides information describing or detailing the heading/section. Examples of headings/sections breaking down any earnings call transcript (e.g., the original current earnings call transcript) may include, but are not limited to: an introduction, a safe harbor statement, an overview, detailed financial results, questions & answers, and a conclusion.

In one or many embodiment(s) described herein, certain headings/sections (e.g., detailed financial results and questions & answers), of the original current earnings call transcript, may provide valuable insights into an overall sentiment of the organization, their performance, and prospective market reactions influenced by the content discussed in said certain headings/sections. Said certain headings/sections may be pertinent to the sentiment analysis of the original current earnings call transcript, and therefore, any earnings conference call to be conducted that may be based on said original current earnings call transcript. Any sentence or line of text included in these certain headings/sections may be referred to herein as an original sentiment-pertinent transcript sentence.

In Step 204, one or more original current earnings call transcript embeddings is/are generated based on the original sentiment-pertinent transcript sentence(s) (selected in Step 202). In one or many embodiment(s) described herein, a text embedding (e.g., an original current earnings call transcript embedding) may generally refer to a numerical representation of a sentence or line of text (e.g., an original sentiment-pertinent transcript sentence), which may be suited for computer-based text semantics analysis. Each said text embedding may be expressed as a vector or array reflecting an ordered sequence of numbers, where the vector/array may be of any arbitrary size (i.e., have any number of vector/array elements). Further, each numerical value forming said text embedding may reference a dimension (i.e., often depicted as a word) within a vocabulary (i.e., any number of unique words) chosen from a corpus (i.e., collection of texts). The numerical values themselves may each, for example, indicate: whether the corresponding dimension/word appears in a given sentence/line of text (where the vector/array is described as sparse); or a frequency of said dimension/word that appears in the given sentence/line of text (where the vector/array is described as dense). Moreover, any original current earnings call transcript embedding(s) may be generated using any existing text vectorization technique.

In Step 206, the original current earnings call transcript embedding(s) (generated in Step 204) is/are processed. In one or many embodiment(s) described herein, processing of the original current earnings call transcript embedding(s) may entail the input thereof into a supervised-learning language model (see e.g., FIG. 1B). The supervised-learning language model, thereafter and based on said inputted original current earnings call transcript embedding(s), may output or produce an original current sentence sentiment (for each original sentiment-pertinent transcript sentence (selected in Step 202)) and an original current transcript sentiment (for the original current earnings call transcript).

In one or many embodiment(s) described herein, each above-mentioned sentiment may be defined through a pair of parameters—i.e., a sentiment tone, and a sentiment score or confidence. The sentiment tone may refer to a predicted polarity (or class) of the mood or mentality (e.g., positive, negative, or neutral) expressed in the original current sentence sentiment for a sentence (e.g., an original sentiment-pertinent transcript sentence), or in the original current transcript sentiment for a document (e.g., the original current earnings call transcript). The sentiment tone for latter may be derived from a collection of the former. For example, the document sentiment tone may be represented as the statistical mode of the collection of sentence sentiment tones—otherwise represented by the sentence sentiment tone that appears the most often across the collection of sentence sentiment tones. The document sentiment tone may be derived using other algorithms without departing from the scope of the embodiments described herein. Meanwhile, the sentiment score/confidence may refer to a numerical value expressing a likelihood or probability that the sentiment tone is correct.

In Step 208, a collection of input features is obtained. In one or many embodiment(s) described herein, the collection of input features may include, but are not limited to: one or more parameters disclosed in a current earnings statement for the organization; one or more historical earnings call reactions influenced by one or more past earnings conference calls, respectively, conducted by the organization; one or more current market metrics defining a state of the current economics market; one or more sets of historical earnings call transcript embeddings for one or more original and/or enhanced past earnings call transcripts, respectively, drafted by the organization; one or more sets of historical sentence sentiments for one or more sets of original and/or enhanced past sentiment-pertinent transcript sentences, respectively, selected from respective historical earnings call transcripts drafted by the organization; one or more historical transcript sentiments for one or more original and/or enhanced past earnings call transcripts, respectively, drafted by the organization; and one or more sets of historical earnings statement embeddings referring to numerically represented text expressed in one or more past earnings statements, respectively, for the organization.

In Step 210, the original current earnings call transcript embedding(s) (generated in Step 204) and the collection of input features (obtained in Step 208) are processed. In one or many embodiment(s) described herein, processing of the original current earnings call transcript embedding(s) and the collection of input features may entail the input thereof into a reinforced-learning language model (see e.g., FIG. 1B). The reinforced-learning language model, thereafter and based on said inputted original current earnings call transcript embedding(s) and said collection of input features, may output or produce a new sentiment-pertinent transcript sentence (corresponding to each original sentiment-pertinent transcript sentence (selected in Step 202)), a new current sentence sentiment (for each new current sentiment-pertinent transcript sentence), and a new current transcript sentiment (for the new current earnings call transcript at least defined by the new sentiment-pertinent transcript sentence (s)). Further, any new sentiment-pertinent transcript sentence may or may not incorporate a modification or modifications to a corresponding original sentiment-pertinent transcript sentence. The objective of said processing, however, is to produce new sentiment-pertinent transcript sentence(s) that raise the sentiment (e.g., through a positive shift in sentiment tones and/or through an increase in sentiment scores/confidences) expressed in the corresponding original sentiment-pertinent transcript sentence(s), respectively.

Hereinafter, the method proceeds to Step 220 (see e.g., FIG. 2B).

Figure 2B:
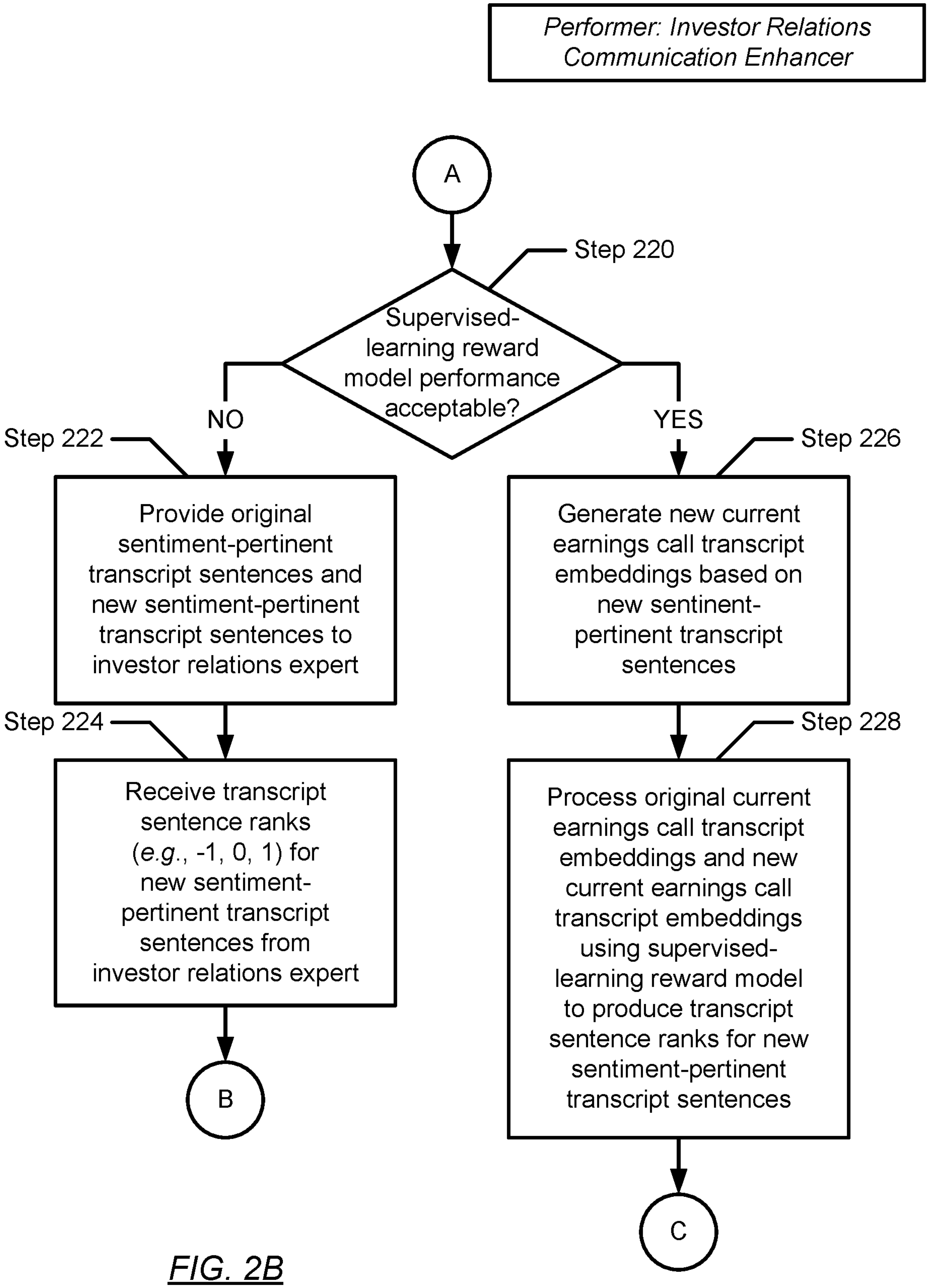

Turning to FIG. 2B, in Step 220, a determination is made as to whether a model performance, measured for the supervised-learning reward model (see e.g., FIG. 1B), is acceptable. Acceptability may be defined by one or more classification model performance metrics (e.g., accuracy, precision, recall, sensitivity, specificity, area under ROC curve, F1 score, etc.), being used to assess said model performance, meeting a predefined model performance metric threshold established for each respective model performance metric. As such, in one or many embodiment(s) described herein, if it is determined that the model performance of the supervised-learning reward model is unacceptable, then the model proceeds to Step 222. On the other hand, in one or many other embodiment(s) described herein, if it is alternatively determined that the model performance of the supervised-learning reward model is acceptable, then the model alternatively proceeds to Step 226.

In Step 222, following the determination (made in Step 222) that a model performance of the supervised-learning reward model is unacceptable (i.e., indicating that the supervised-learning reward model should undergo further training by way of labeled samples), an investor relations expert is consulted. Particularly, in one or many embodiment(s) described herein, the investor relations expert may be provided with the original sentiment-pertinent transcript sentence(s) (selected in Step 202) and the corresponding new sentiment-pertinent transcript sentence(s) (produced in Step 210) via transmission/presentation thereof to/on the client device which the investor relations expert operates.

In Step 224, in response to consulting the investor relations expert (performed in Step 222), human feedback is received. In one or many embodiment(s) described herein, the human feedback may include one or more transcript sentence ranks. Any transcript sentence rank may indicate an opinion of the consulted investor relations expert concerning a comparison performed thereby between an original sentiment-pertinent transcript sentence and a corresponding new sentiment-pertinent transcript sentence. Said opinion, more specifically, may be expressed as a simplified indicator (e.g., −1, 0, or 1) reflecting whether any new sentiment-pertinent transcript sentence has degraded (e.g., −1), remained the same (e.g., 0), or improved (e.g., 1) sentimentally in comparison with the corresponding original sentiment-pertinent transcript sentence. Any new sentiment-pertinent transcript sentence that indicate sentimental improvement over their respective original sentiment-pertinent transcript sentence may be referred to herein as an enhanced sentiment-pertinent transcript sentence.

Hereinafter, the method proceeds to Step 240 (see e.g., FIG. 2C).

In Step 226, following the alternate determination (made in Step 220) that a model performance of the supervised-learning reward model is acceptable (i.e., indicating that the supervised-learning reward model has undergone sufficient training by way of labeled samples), one or more new current earnings call transcript embeddings is/are generated. In one or many embodiment(s) described herein, each new current earnings call transcript embedding may be obtained through text vectorization of a corresponding new sentiment-pertinent transcript sentence (produced in Step 210).

In Step 228, the original current earnings call transcript embedding(s) (generated in Step 204) and the new current earnings call transcript embedding(s) (generated in Step 226) are processed. In one or many embodiment(s) described herein, processing of the original current earnings call transcript embedding(s) and the new current earnings call transcript embedding(s) may entail the input thereof into supervised-learning reward model (see e.g., FIG. 1B). The supervised-learning reward model, thereafter and based on said inputted original current earnings call transcript embedding(s) and said inputted new current earnings call transcript embedding(s), may output or produce a transcript sentence rank (for each new sentiment-pertinent transcript sentence (produced in Step 210) corresponding to a given new current earnings call transcript embedding). Each produced transcript sentence rank, similarly to human feedback (received in Step 224), may be expressed as a simplified indicator (e.g., −1, 0, or 1) predicting whether any new sentiment-pertinent transcript sentence has degraded (e.g., −1), remained the same (e.g., 0), or improved (e.g., 1) sentimentally in comparison with the corresponding original sentiment-pertinent transcript sentence.

Hereinafter, the method proceeds to Step 244 (see e.g., FIG. 2C).

Figure 2C:
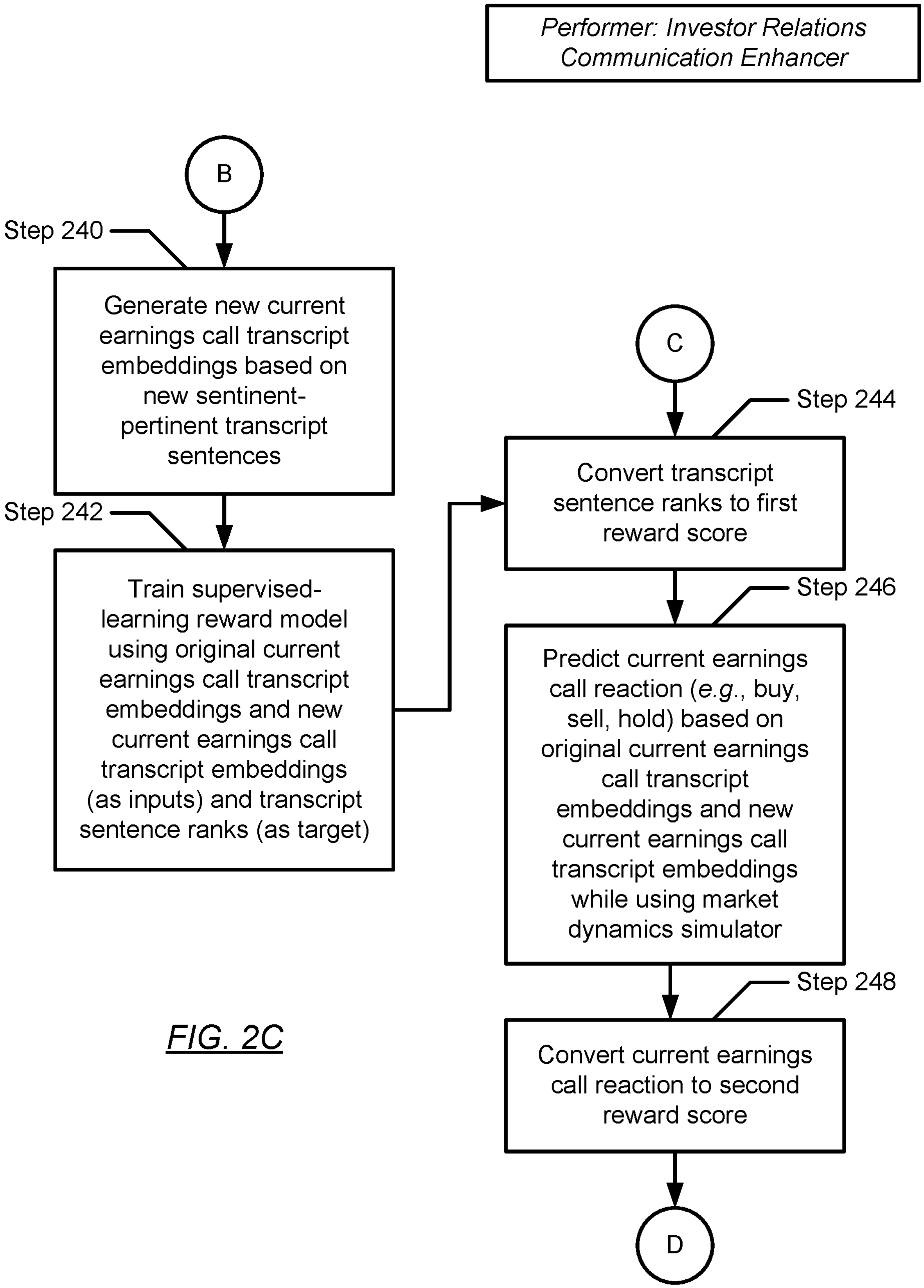

Turning to FIG. 2C, in Step 240, following the receiving of one or more transcript sentence ranks (in Step 224) via human feedback, one or more new current earnings call transcript embeddings is/are generated. In one or many embodiment(s) described herein, each new current earnings call transcript embedding may be obtained through text vectorization of a corresponding new sentiment-pertinent transcript sentence (produced in Step 210).

In Step 242, the supervised-learning reward model (determined to be insufficiently trained in Step 220) is further trained using the original current earnings call transcript embedding(s) (generated in Step 204), the new current earnings call transcript embedding(s) (generated in Step 240), and the transcript sentence rank(s) (received in Step 224). More specifically, each training sample may include an original current earnings call transcript embedding (for an original sentiment-pertinent transcript sentence) and a corresponding new current earnings call transcript embedding (for a corresponding new sentiment-pertinent transcript sentence) as the sample inputs, whereas a transcript sentence rank (respective to the corresponding new sentiment-pertinent transcript sentence) serves as the sample target.

Hereinafter, the method proceeds to Step 244 (described below).

In Step 244, following a training of the supervised-learning reward model (performed in Step 242), or following a processing of the original current earnings call transcript embedding(s) (generated in Step 204) and the new current earnings call transcript embedding(s) (generated in Step 226), any transcript sentence rank(s) (received in Step 224 or produced in Step 228) is/are converted to a first reward score. In one or many embodiment(s) described herein, the first reward score may refer to a scalar, numerical value measuring the actual or predicted human preference(s) between the pair(s) of original and new sentiment-pertinent transcript sentences. Computation of said first reward score may entail any algorithm(s) through which a scalar, numerical value may be derived from the manipulation of the transcript sentence rank(s).

In Step 246, a current earnings call reaction is predicted. In one or many embodiment(s) described herein, the current earnings call reaction may refer to a predicted investment action (e.g., buy, sell, or hold) concerning organization stock representing ownership shares issued for the organization, which may be prospectively performed by investors and analysts influenced by any current earnings conference call conducted by the organization. Further, prediction of the current earnings call reaction may entail inputting the original current earnings call transcript embedding(s) (generated in Step 204) and the new current earnings call transcript embedding(s) (generated in Step 226) into the market dynamics simulator (see e.g., FIG. 1B) for processing thereof based on any number of factors (e.g., historical earnings call transcript(s), historical earnings call reaction (s), historical and current market metrics, historical and current earning statements, etc.).

In Step 248, the current earnings call reaction (predicted in Step 246) is converted to a second reward score. In one or many embodiment(s) described herein, the second reward score may refer to a scalar, numerical value measuring the predicted human preference(s) between the pair(s) of original and new sentiment-pertinent transcript sentences. Computation of said second reward score may entail any algorithm(s) through which a scalar, numerical value may be derived from the manipulation of the current earnings call reaction.

Hereinafter, the method proceeds to Step 260 (see e.g., FIG. 2D).

Figure 2D:
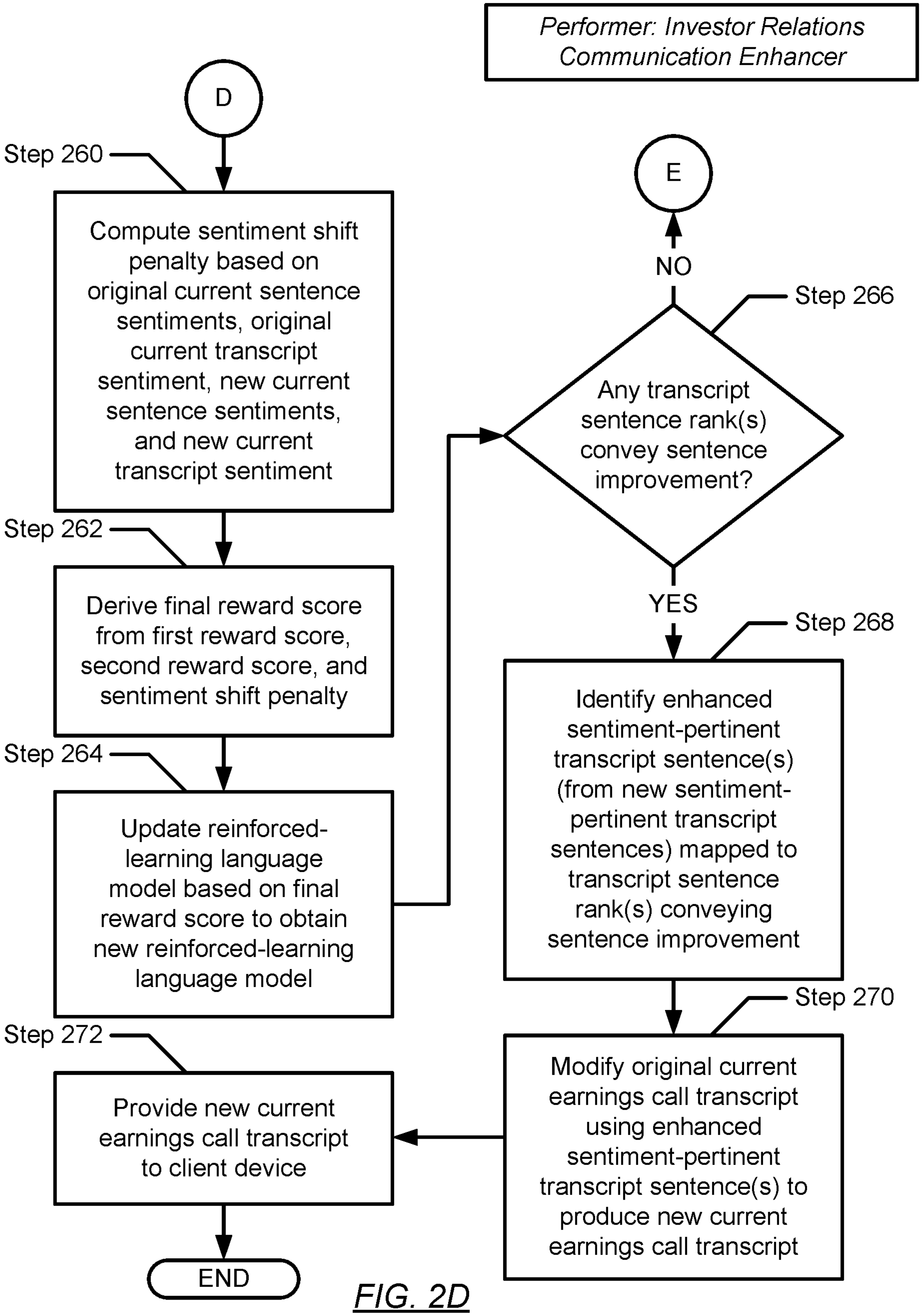

Turning to FIG. 2D, in Step 260, a sentiment shift penalty is computed. In one or many embodiment(s) described herein, the sentiment shift penalty may refer to a scalar, numerical value representing a difference in sentiments produced by the supervised-learning language model and the reinforced-learning language model. Said difference may be measured through any existing statistical distance (e.g., the Kullback-Leibler (KL) divergence) applied to, and thus between: (i) each pair of an original current sentence sentiment (produced in Step 206) and a corresponding new current sentence sentiment (produced in Step 210); and/or (ii) the original current transcript sentiment (also produced in Step 206) and the new current transcript sentiment (also produced in Step 210). Computation of said sentiment shift penalty may entail any algorithm(s) through which a scalar, numerical value may be derived from the manipulation of at least one statistical distance value.

In Step 262, a final reward score is derived. Specifically, in one or many embodiment(s) described herein, derivation of the final reward score may entail any algorithm(s) through which a scalar, numerical value may be produced from the manipulation of the first reward score (obtained in Step 244), the second reward score (obtained in Step 248), and the sentiment shift penalty (computed in Step 260). By way of a non-limiting example, the final reward score may be calculated using the mathematical formula: final reward score=[first reward score+second reward score]−[weight value×sentiment shift penalty].

In Step 264, the reinforced-learning language model, or more specifically, any number of model parameters and/or model hyper-parameters influencing a behavior of the reinforced-learning language model, is/are updated. In one or many embodiment(s) described herein, said updating may be based on the final reward score (derived in Step 262), and may be performed through any existing model optimization algorithm. By way of a non-limiting example, said existing model optimization algorithm may entail proximal policy optimization (PPO), which references a trust region optimization algorithm that uses constraints on the update gradient to ensure that the update step does not destabilize the reinforced-learning process. In updating the reinforced-learning language model, a new reinforced-learning language model, reflecting adjusted model parameters and/or model hyper-parameters, is obtained.

In Step 266, a determination is made as to whether any transcript sentence rank(s) (received in Step 224 or produced in Step 228) indicate a sentimental improvement of any new sentiment-pertinent transcript sentence(s) (produced in Step 210) over any corresponding original sentiment-pertinent transcript sentence(s) (selected in Step 202). In terms of a comparison between a given new sentiment-pertinent transcript sentence and a corresponding, given original sentiment-pertinent transcript sentence, sentimental improvement may be defined by: (i) the given new sentiment-pertinent transcript sentence being associated with a first sentiment tone (e.g., positive, negative, or neutral) that is sentimentally better (i.e., positive>neutral>negative) than a second sentiment tone associated with the corresponding, given original sentiment-pertinent transcript sentence (should the first and second sentiment tones mismatch); or (ii) the given new sentiment-pertinent transcript sentence being associated with a first sentiment score/confidence exceed a second sentiment score/confidence associated with the corresponding, given original sentiment-pertinent transcript sentence (should the first and second sentiment tones match). Other criteria for defining sentimental improvement may be used without departing from the scope of the embodiments described herein.

As such, in one or many embodiment(s) described herein, if it is determined that at least one transcript sentence rank (received in Step 224 or produced in Step 228) indicates a sentimental improvement of any new sentiment-pertinent transcript sentence(s) (produced in Step 210) over any corresponding original sentiment-pertinent transcript sentence(s) (selected in Step 202), then the method proceeds to Step 268. On the other hand, in one or many other embodiment(s) described herein, if it is alternatively determined that none of the transcript sentence rank(s) indicate said sentimental improvement, then the method alternatively proceeds to Step 210.

In Step 268, following the determination (made in Step 266) that at least one transcript sentence rank (received in Step 224 or produced in Step 228) indicates a sentimental improvement, one or more enhanced sentiment-pertinent transcript sentences is/are identified. In one or many embodiment(s) described herein, the enhanced sentiment-pertinent transcript sentence(s) may reference new sentiment-pertinent transcript sentence(s), respectively, that map to said at least one transcript sentence rank indicating sentimental improvement.

In Step 270, the original current earnings call transcript (received via the enhancement request in Step 200) is modified using the enhanced sentiment-pertinent transcript sentence(s) (identified in Step 268). Particularly, any subset of the original sentiment-pertinent transcript sentence(s) (selected in Step 202) of the original current earnings call transcript, which maps to any corresponding new sentiment-pertinent transcript sentence(s) (produced in Step 210) that is/are reflective of sentimental improvement, may be replaced by their respective enhanced sentiment-pertinent transcript sentence(s). Through modification of the original current earnings call transcript in this manner, a new current earnings call transcript is produced.

In Step 272, in response to the enhancement request (received in Step 200), the new current earnings call transcript (produced in Step 270) is provided or transmitted to the client device wherefrom said enhancement request originated.

At the re-visited Step 210, following the alternate determination (made in Step 266) that none of the transcript sentence rank(s) (received in Step 224 or produced in Step 228) indicate said sentimental improvement, the original current earnings call transcript embedding(s) (generated in Step 204) and the input features (obtained in Step 208) are re-processed using the new reinforced-learning language model (obtained in Step 264) to produce one or more newer sentiment-pertinent transcript sentences, one or more newer current sentence sentiments, and a newer current transcript sentiment. From there, the method proceeds as described above with the exception that: any new sentiment-pertinent transcript sentence(s) is/are replaced by the newer sentiment-pertinent transcript sentence(s); any new current sentence sentiment(s) is/are replaced by the newer current sentence sentiment(s); and the new current transcript sentiment is replaced by the newer current transcript sentiment.

Figure 3:
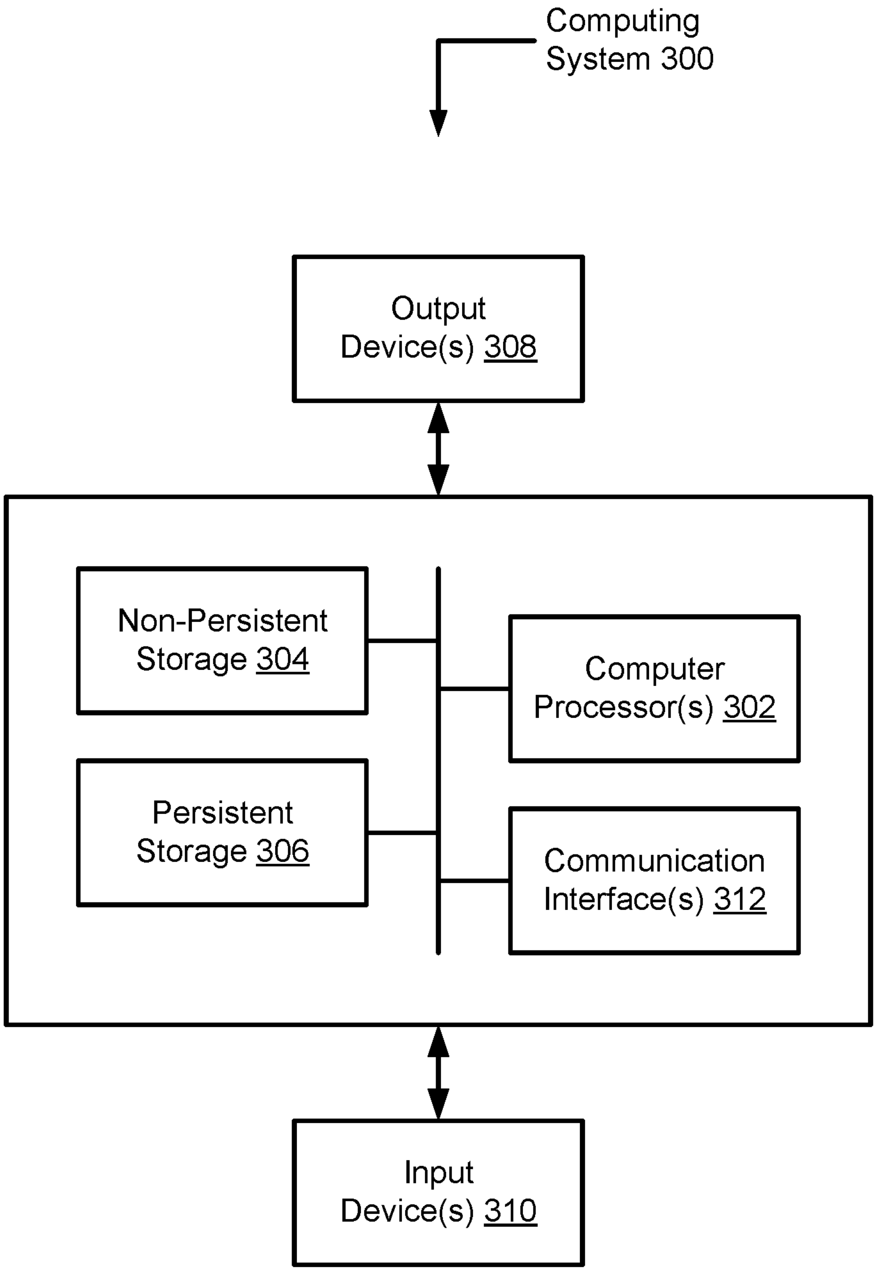
FIG. 3 shows a computing system in accordance with one or more embodiments described herein.

FIG. 3 shows a computing system in accordance with one or more embodiments described herein. The computing system (300) may include one or more computer processors (302), non-persistent storage (304) (e.g., volatile memory, such as random access memory (RAM), cache memory), persistent storage (306) (e.g., a hard disk, an optical drive such as a compact disk (CD) drive or digital versatile disk (DVD) drive, a flash memory, etc.), a communication interface (6312) (e.g., Bluetooth interface, infrared interface, network interface, optical interface, etc.), input devices (310), output devices (308), and numerous other elements (not shown) and functionalities. Each of these components is described below.

In one or many embodiment(s) described herein, the computer processor(s) (302) may be an integrated circuit for processing instructions. For example, the computer processor(s) may be one or more cores or micro-cores of a central processing unit (CPU) and/or a graphics processing unit (GPU). The computing system (300) may also include one or more input devices (310), such as a touchscreen, keyboard, mouse, microphone, touchpad, electronic pen, or any other type of input device. Further, the communication interface (312) may include an integrated circuit for connecting the computing system (300) to a network (not shown) (e.g., a local area network (LAN), a wide area network (WAN) such as the Internet, mobile network, or any other type of network) and/or to another device, such as another computing device.

In one or many embodiment(s) described herein, the computing system (300) may include one or more output devices (308), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (302), non-persistent storage (304), and persistent storage (306). Many different types of computing systems exist, and the aforementioned input and output device(s) may take other forms.

Software instructions in the form of computer readable program code to perform embodiments described herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or many embodiment(s) described herein.

FIG. 4 shows example sentiment-pertinent transcript sentences in accordance with one or more embodiments described herein. The example sentiment-pertinent transcript sentences (400) are presented for explanatory purposes only and not intended to limit the embodiments described herein.

The example sentiment-pertinent transcript sentences (400) include an example original sentiment-pertinent transcript sentence (402) and an example enhanced sentiment-pertinent transcript sentence (404) corresponding thereto. The former (402) recites negative connotations encouraging a high likelihood for misunderstandings or misinterpretations by analysts, investors, and other stakeholders regarding the future strategy and outlook for an organization. Meanwhile, the latter (404), which is a product of sentiment based enhancement of investor relations communication in accordance with embodiments described herein, reflects positive connotations substantially covering the same message content that serves to mitigate any said misunderstandings/misinterpretations.

While embodiments described herein have been described with respect to a limited number of embodiments, those skilled in the art, having benefit of this disclosure, will appreciate that other embodiments can be devised which do not depart from the scope of the embodiments described herein. Accordingly, the scope of the embodiments described herein should be limited only by the attached claims.

What is claimed is:

1. A method for training and updating machine learning models to perform sentiment-based enhancement of investor relations communication, the method comprising:

receiving an enhancement request comprising an original current earnings call transcript;

generating, using the original current earnings call transcript as an input to a text embedding generator a text embedding generator configured to perform text vectorization that translates each original sentiment-pertinent transcript sentence into a numerical vector of ordered values representing word dimensions within a finance-domain vocabulary, a plurality of original current earnings call transcript embeddings respectively based on a plurality of original sentiment-pertinent transcript sentences extracted from the original current earnings call transcript;

processing, using a supervised-learning language model, the plurality of original current earnings call transcript embeddings to generate a plurality of original current sentence sentiments, each original current sentence sentiment comprising a sentiment tone classification and a sentiment confidence score;

processing, using a reinforced-learning language model configured with a policy neural network implementing a partially observable Markov decision process (POMDP), the plurality of original current earnings call transcript embeddings and a collection of input features comprising at least historical earnings call transcript embeddings, historical earnings call reactions, and current market metrics, to generate a plurality of new sentiment-pertinent transcript sentences and a plurality of new current sentence sentiments, each new current sentence sentiment comprising a sentiment tone classification and a sentiment confidence score;

making a first determination that a model performance of a supervised-learning reward model is unacceptable based on a measurement from one or more classification model performance metrics against a predefined model performance metric threshold;

in response to the first determination:

providing the plurality of original sentiment-pertinent transcript sentences and the plurality of new sentiment-pertinent transcript sentences to an investor relations expert for sentimentality comparison; and receiving, from the investor relations expert, a plurality of transcript sentence ranks each expressed as a numerical indicator reflecting whether a corresponding new sentiment-pertinent transcript sentence has degraded, remained the same, or improved sentimentally relative to a corresponding original sentiment-pertinent transcript sentence;

generating a plurality of new current earnings call transcript embeddings respectively based on the plurality of new sentiment-pertinent transcript sentences;

training the supervised-learning reward model using, as training inputs, the plurality of original current earnings call transcript embeddings and the plurality of new current earnings call transcript embeddings, and using, as training targets, the plurality of transcript sentence ranks;

in response to determining that the model performance of the supervised-learning reward model meets the predefined model performance metric threshold: processing, using the trained supervised-learning reward model, the plurality of original current earnings call transcript embeddings and the plurality of new current earnings call transcript embeddings to produce a plurality of transcript sentence ranks;

identifying a subset of the plurality of transcript sentence ranks each indicating a sentiment improvement based on at least one of: (i) a positive shift in sentiment tone classification, or (ii) an increase in sentiment confidence score;

producing, from the original current earnings call transcript, a new current earnings call transcript comprising a set of enhanced sentiment-pertinent transcript sentences respectively mapped to the subset of the plurality of transcript sentence ranks;

converting the plurality of transcript sentence ranks into a first reward score;

predicting, using a market dynamics simulator employing ensemble Gaussian processes applied to historical earnings call transcripts and historical earnings call reactions, a current earnings call reaction at least based on the plurality of original current earnings call transcript embeddings and the plurality of new current earnings call transcript embeddings;

converting the current earnings call reaction into a second reward score;

computing a sentiment shift penalty by applying Kullback-Leibler (KL) divergence to measure a statistical distance between each pair of an original current sentence sentiment and a corresponding new current sentence sentiment, wherein the sentiment shift penalty serves as a stability constraint that limits divergence of the reinforced-learning language model from its supervised-learning alignment;

deriving a final reward score from the first reward score, the second reward score, and the sentiment shift penalty;

updating the reinforced-learning language model based on the final reward score, wherein updating the reinforced-learning language model comprises applying proximal policy optimization (PPO) to adjust model parameters of the reinforced-learning language model, wherein the PPO constrains update gradients using trust region optimization to stabilize the reinforced-learning process and prevent degradation of the model's acquired alignment; and providing the new current earnings call transcript in response to the enhancement request.

2. A non-transitory computer readable medium (CRM) comprising computer readable program code, which when executed by a computer processor, enables the computer processor to perform a method for training and updating machine learning models to perform sentiment-based enhancement of investor relations communication, the method comprising:

receiving an enhancement request comprising an original current earnings call transcript;

generating, using the original current earnings call transcript as an input to a text embedding generator a text embedding generator configured to perform text vectorization that translates each original sentiment-pertinent transcript sentence into a numerical vector of ordered values representing word dimensions within a finance-domain vocabulary, a plurality of original current earnings call transcript embeddings respectively based on a plurality of original sentiment-pertinent transcript sentences extracted from the original current earnings call transcript;

processing, using a supervised-learning language model, the plurality of original current earnings call transcript embeddings to generate a plurality of original current sentence sentiments, each original current sentence sentiment comprising a sentiment tone classification and a sentiment confidence score;

processing, using a reinforced-learning language model configured with a policy neural network implementing a partially observable Markov decision process (POMDP), the plurality of original current earnings call transcript embeddings and a collection of input features comprising at least historical earnings call transcript embeddings, historical earnings call reactions, and current market metrics, to generate a plurality of new sentiment-pertinent transcript sentences and a plurality of new current sentence sentiments, each new current sentence sentiment comprising a sentiment tone classification and a sentiment confidence score;

making a first determination that a model performance of a supervised-learning reward model is unacceptable based on a measurement from one or more classification model performance metrics against a predefined model performance metric threshold;

in response to the first determination:

providing the plurality of original sentiment-pertinent transcript sentences and the plurality of new sentiment-pertinent transcript sentences to an investor relations expert for sentimentality comparison; and receiving, from the investor relations expert, a plurality of transcript sentence ranks each expressed as a numerical indicator reflecting whether a corresponding new sentiment-pertinent transcript sentence has degraded, remained the same, or improved sentimentally relative to a corresponding original sentiment-pertinent transcript sentence;

generating a plurality of new current earnings call transcript embeddings respectively based on the plurality of new sentiment-pertinent transcript sentences;

training the supervised-learning reward model using, as training inputs, the plurality of original current earnings call transcript embeddings and the plurality of new current earnings call transcript embeddings, and using, as training targets, the plurality of transcript sentence ranks;

in response to determining that the model performance of the supervised-learning reward model meets the predefined model performance metric threshold: processing, using the trained supervised-learning reward model, the plurality of original current earnings call transcript embeddings and the plurality of new current earnings call transcript embeddings to produce a plurality of transcript sentence ranks;

identifying a subset of the plurality of transcript sentence ranks each indicating a sentiment improvement based on at least one of: (i) a positive shift in sentiment tone classification, or (ii) an increase in sentiment confidence score;

producing, from the original current earnings call transcript, a new current earnings call transcript comprising a set of enhanced sentiment-pertinent transcript sentences respectively mapped to the subset of the plurality of transcript sentence ranks;

converting the plurality of transcript sentence ranks into a first reward score;

predicting, using a market dynamics simulator employing ensemble Gaussian processes applied to historical earnings call transcripts and historical earnings call reactions, a current earnings call reaction at least based on the plurality of original current earnings call transcript embeddings and the plurality of new current earnings call transcript embeddings;

converting the current earnings call reaction into a second reward score;

computing a sentiment shift penalty by applying Kullback-Leibler (KL) divergence to measure a statistical distance between each pair of an original current sentence sentiment and a corresponding new current sentence sentiment, wherein the sentiment shift penalty serves as a stability constraint that limits divergence of the reinforced-learning language model from its supervised-learning alignment;

deriving a final reward score from the first reward score, the second reward score, and the sentiment shift penalty;

updating the reinforced-learning language model based on the final reward score, wherein updating the reinforced-learning language model comprises applying proximal policy optimization (PPO) to adjust model parameters of the reinforced-learning language model, wherein the PPO constrains update gradients using trust region optimization to stabilize the reinforced-learning process and prevent degradation of the model's acquired alignment; and providing the new current earnings call transcript in response to the enhancement request.

3. An investor relations communication enhancer, comprising:

a computer processor configured to perform a method for training and updating machine learning models to perform sentiment-based enhancement of investor relations communication, the method comprising:

receiving an enhancement request comprising an original current earnings call transcript;

generating, using the original current earnings call transcript as an input to a text embedding generator a text embedding generator configured to perform text vectorization that translates each original sentiment-pertinent transcript sentence into a numerical vector of ordered values representing word dimensions within a finance-domain vocabulary, a plurality of original current earnings call transcript embeddings respectively based on a plurality of original sentiment-pertinent transcript sentences extracted from the original current earnings call transcript;

processing, using a supervised-learning language model, the plurality of original current earnings call transcript embeddings to generate a plurality of original current sentence sentiments, each original current sentence sentiment comprising a sentiment tone classification and a sentiment confidence score;

processing, using a reinforced-learning language model configured with a policy neural network implementing a partially observable Markov decision process (POMDP), the plurality of original current earnings call transcript embeddings and a collection of input features comprising at least historical earnings call transcript embeddings, historical earnings call reactions, and current market metrics, to generate a plurality of new sentiment-pertinent transcript sentences and a plurality of new current sentence sentiments, each new current sentence sentiment comprising a sentiment tone classification and a sentiment confidence score;

making a first determination that a model performance of a supervised-learning reward model is unacceptable based on a measurement from one or more classification model performance metrics against a predefined model performance metric threshold;

in response to the first determination:

providing the plurality of original sentiment-pertinent transcript sentences and the plurality of new sentiment-pertinent transcript sentences to an investor relations expert for sentimentality comparison; and receiving, from the investor relations expert, a plurality of transcript sentence ranks each expressed as a numerical indicator reflecting whether a corresponding new sentiment-pertinent transcript sentence has degraded, remained the same, or improved sentimentally relative to a corresponding original sentiment-pertinent transcript sentence;

generating a plurality of new current earnings call transcript embeddings respectively based on the plurality of new sentiment-pertinent transcript sentences;

training the supervised-learning reward model using, as training inputs, the plurality of original current earnings call transcript embeddings and the plurality of new current earnings call transcript embeddings, and using, as training targets, the plurality of transcript sentence ranks;

in response to determining that the model performance of the supervised-learning reward model meets the predefined model performance metric threshold:

processing, using the trained supervised-learning reward model, the plurality of original current earnings call transcript embeddings and the plurality of new current earnings call transcript embeddings to produce a plurality of transcript sentence ranks;

identifying a subset of the plurality of transcript sentence ranks each indicating a sentiment improvement based on at least one of: (i) a positive shift in sentiment tone classification, or (ii) an increase in sentiment confidence score;

producing, from the original current earnings call transcript, a new current earnings call transcript comprising a set of enhanced sentiment-pertinent transcript sentences respectively mapped to the subset of the plurality of transcript sentence ranks;

converting the plurality of transcript sentence ranks into a first reward score;

predicting, using a market dynamics simulator employing ensemble Gaussian processes applied to historical earnings call transcripts and historical earnings call reactions, a current earnings call reaction at least based on the plurality of original current earnings call transcript embeddings and the plurality of new current earnings call transcript embeddings;

converting the current earnings call reaction into a second reward score;

computing a sentiment shift penalty by applying Kullback-Leibler (KL) divergence to measure a statistical distance between each pair of an original current sentence sentiment and a corresponding new current sentence sentiment, wherein the sentiment shift penalty serves as a stability constraint that limits divergence of the reinforced-learning language model from its supervised-learning alignment;

deriving a final reward score from the first reward score, the second reward score, and the sentiment shift penalty;

updating the reinforced-learning language model based on the final reward score, wherein updating the reinforced-learning language model comprises applying proximal policy optimization (PPO) to adjust model parameters of the reinforced-learning language model, wherein the PPO constrains update gradients using trust region optimization to stabilize the reinforced-learning process and prevent degradation of the model's acquired alignment; and providing the new current earnings call transcript in response to the enhancement request.

* * * * *